Figure 2:
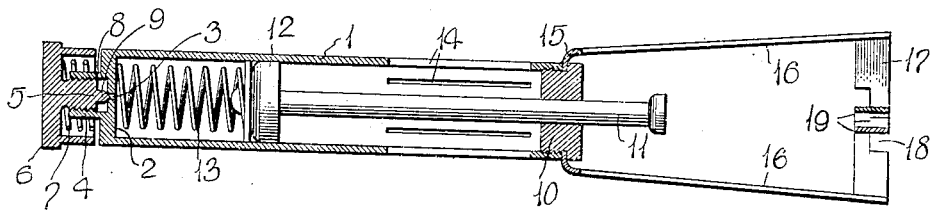

F. W. SMISING.
AUTOMATIC CAMERA TRIP.
APPLICATION FILED JUNE 24, 1915.

1,204,506.

Patented Nov. 14, 1916.

Witnesses
Chas. W. Stauffiger
Karl H. Butler

Inventor
Frederick W. Smising,

By
[signature]

Attorneys

UNITED STATES PATENT OFFICE.

FREDERICK W. SMISING, OF DETROIT, MICHIGAN.

AUTOMATIC CAMERA-TRIP.

1,204,506.    Specification of Letters Patent.    Patented Nov. 14, 1916.

Application filed June 24, 1915. Serial No. 35,983.

*To all whom it may concern:*

Be it known that I, FREDERICK W. SMISING, a citizen of the United States of America, residing at Detroit, in the county of Wayne and State of Michigan, have invented certain new and useful Improvements in Automatic Camera-Trips, of which the following is a specification, reference being had therein to the accompanying drawings.

This invention relates to an automatic camera trip, and the object of my invention is to provide a device which permits of the operator or owner of a camera setting the device to automatically trip the shutter mechanism of the camera and then assuming a position in front of the camera to be included in the picture taken by the camera.

The device is constructed upon the principles of a dash pot and has been especially designed for that type of camera wherein the shutter mechanism is actuated through the medium of a button, but provision is made whereby the device is applicable to types of cameras having lever actuated shutter mechanism.

The mechanical construction of the device will be hereinafter set forth and then claimed, and reference will now be had to the drawing, wherein—

Figure 3:
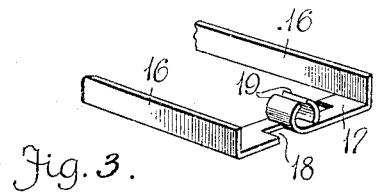
Figure 1:
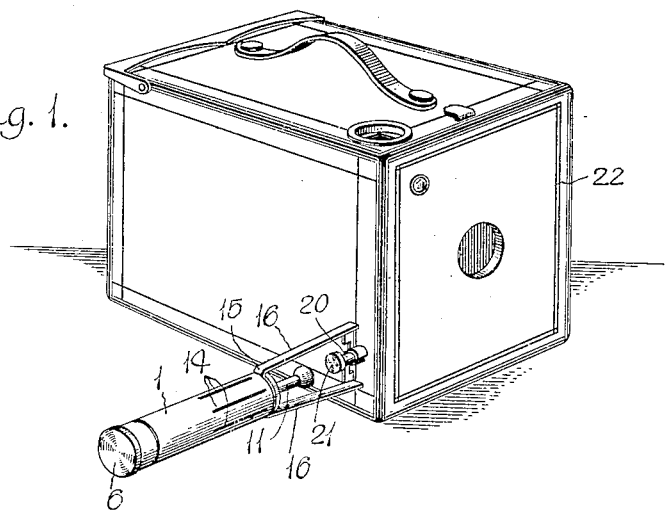

Figure 1 is a perspective view of a box camera provided with the automatic trip; Fig. 2 is an enlarged longitudinal sectional view of the automatic camera trip as designed for a box camera, and Fig. 3 is a perspective view of a portion of the trip device showing clamping members.

In the drawing, the reference numeral 1 denotes a cylinder having the outer end thereof closed by a wall 2 provided with a concentric vent opening 3. The wall 2 has a valve casing 4 interiorly screwthreaded to receive an adjustable valve stem 5 having a valve cap 6, said valve cap housing a coiled compression spring 7 encircling the casing 4 between the cap and the wall 2. The spring 7 prevents accidental rotation of the valve cap 6 by maintaining the threads of the valve stem 5 in frictional contact with the threads of the casing 4. The valve casing 4 has an air vent 8 and the valve stem 5 has a needle valve 9, said needle valve controlling the passage of air through the vent 3 of the wall 2.

The inner end of the cylinder 1 is interiorly screw-threaded to accommodate a guide head 10 of a plunger 11 which has a packed head 12 within the cylinder 1. A coiled compression spring 13 is located within the cylinder between the wall 2 and the head 12, and said spring causes a rapid and sudden movement of the plunger 11 when the head 12 reaches longitudinal slits or slots 14 at the inner end of the cylinder 1, these slits or slots exhausting air from the outer end of the cylinder.

Connected to the inner end of the cylinder is a ring 15 supporting diametrically opposed resilient clamping arms 16. The ring 15 is preferably clamped between the inner end of the cylinder 1 and the guide head 10, as best shown in Fig. 3. The clamping arms 16 are provided with inwardly projecting members 17 and the inner ends of said members are slitted and portions thereof bent to provide semi-cylindrical jaws 19 which coöperate in engaging the shank 20 of an operating button 21 of a camera 22. The jaws 19 sufficiently grip the shank 20 to maintain the trip device in operative relation to the button 21, but the clamping effect of the jaws 19 is not sufficient to retard an inward movement of the button 21 when impinged by the plunger 11. To place the trip device in engagement with the camera 22 it is necessary to press the clamping arms 16 inwardly to separate the opposed jaws 19 whereby said jaws can be placed in position to grip the shank of the operating button of the camera.

In operation, the needle valve 9 controls the inward movement of the plunger 11 until the outer end of the cylinder 1 exhausts through the slits or slots 14 of said cylinder. It is an extremely easy matter to push the plunger 11 outwardly to place the spring 13 under tension and force air from the outer end of the cylinder. When the plunger 11 is manually released, the spring 13 gradually moves the plunger toward the button 21 of the camera and it is during this interim that the operator assumes a position in front of the camera to be included in the picture taken thereby.

With the clamping arms 16 in a vertical plane, as shown in Fig. 1, one of the clamping arms bears against the side wall of the camera, thus preventing the device from tilting relative to the camera and thereby maintaining the plunger 11 in alinement with the operating button 21.

It is thought that the operation and utility of my invention will be apparent without further description, and while in the drawing there is illustrated the preferred embodiments of my invention, it is to be understood that the structural elements are susceptible to such variations and modifications as fall within the scope of the appended claims.

What I claim is:—

1. In an automatic tripping device for cameras, an attachment for said device comprising clamping arms adapted for attachment to said device, and jaws carried by said arms and adapted to embrace a portion of the camera button to hold said device in longitudinal alinement with said camera button.

2. In an automatic tripping device for cameras, an attachment for said device comprising resilient clamping arms, members carried by said arms adapted for abutting a camera and supporting said arms substantially at right angles to the camera, and jaws forming part of said members adapted to embrace a portion of a camera button to maintain said device in longitudinal alinement with the camera button.

3. A support for a camera operating device, comprising resilient arms adapted to be held at a wall of a camera, and jaws carried by said arms adapted to embrace an operating instrumentality of said camera to maintain the operating device at substantially a right angle to the walls of the camera.

4. A device adapted for actuating the operating instrumentality of a camera, comprising clamping arms adapted to have the ends thereof embrace a portion of the operating instrumentality of a camera to retain the actuating device in longitudinal alinement with the operating instrumentality.

In testimony whereof I affix my signature in presence of two witnesses.

FREDERICK W. SMISING.

Witnesses:
ANNA M. DORR,
KARL H. BUTLER.

Copies of this patent may be obtained for five cents each, by addressing the "Commissioner of Patents, Washington, D. C."